United States Patent
Cohen

(10) Patent No.: US 11,805,896 B2
(45) Date of Patent: Nov. 7, 2023

(54) CABINET

(71) Applicant: Alterkraft SA, Geneva (CH)

(72) Inventor: Julien Cohen, Luxembourg (LU)

(73) Assignee: Alterkraft SA, Geneva (CH)

( * ) Notice: Subject to any disclaimer, the term of this patent is extended or adjusted under 35 U.S.C. 154(b) by 205 days.

(21) Appl. No.: 17/421,773

(22) PCT Filed: Jan. 10, 2020

(86) PCT No.: PCT/EP2020/050560
§ 371 (c)(1),
(2) Date: Jul. 9, 2021

(87) PCT Pub. No.: WO2020/144341
PCT Pub. Date: Jul. 16, 2020

(65) Prior Publication Data
US 2022/0079334 A1    Mar. 17, 2022

(30) Foreign Application Priority Data

Jan. 10, 2019 (FR) ........................................ 1900243

(51) Int. Cl.
*A47B 31/04* (2006.01)
*B62B 3/02* (2006.01)

(52) U.S. Cl.
CPC .............. *A47B 31/04* (2013.01); *B62B 3/025* (2013.01); *A47B 2220/0086* (2013.01);
(Continued)

(58) Field of Classification Search
CPC ............ A47B 31/04; A47B 2220/0086; A47B 2031/002; A47B 43/02; B62B 3/025;
(Continued)

(56) References Cited

U.S. PATENT DOCUMENTS 5,316,210 A * 5/1994 Scullin ............... B65D 5/48048
229/172
6,547,263 B1 * 4/2003 McGeorge ............... B65D 5/00
280/30
(Continued)

FOREIGN PATENT DOCUMENTS

EP       0271118 A2 *  6/1988
EP       3199465 A1 *  8/2017
(Continued)

OTHER PUBLICATIONS

Translated FR-2877551-A1 (Year: 2023).*

*Primary Examiner* — James A Shriver, II
*Assistant Examiner* — Ian Bryce Shelton
(74) *Attorney, Agent, or Firm* — 24IP LAW GROUP USA, PLLC; Timothy DeWitt

(57) ABSTRACT

The present invention provides a cabinet (2) intended for transporting and distributing meal trays in aircraft, for example to provide a trolley (1) which can be reinforced with a frame (3). The cabinet is made of a fireproof, water-repellent, alveolate cardboard material, the cabinet comprising an upper face, a lower face, two side faces, a rear face, a front face forming a door, which are made of a single piece of cardboard. The invention also provides for the use of a flat sheet of cardboard, pre-cut in a structured manner, to form a cabinet in a single piece when folded and assembled, preferably of parallelepipedal shape, the sheet of cardboard having a thickness of 6 mm to 10 mm, and a method of manufacturing a cabinet comprising the provision of such a sheet of cardboard, to form a cabinet.

7 Claims, 12 Drawing Sheets

(52) U.S. Cl.
CPC ....... *B62B 2202/67* (2013.01); *B62B 2205/00* (2013.01); *B62B 2501/062* (2013.01)

(58) Field of Classification Search
CPC ............ B62B 2202/67; B62B 2205/00; B62B 2501/062; B62B 3/005
See application file for complete search history.

(56) References Cited

U.S. PATENT DOCUMENTS

| | | | | |
|---|---|---|---|---|
| 8,556,278 | B2 * | 10/2013 | Brittain | ................ B65D 5/0227 |
| | | | | 280/37 |
| 8,596,518 | B2 * | 12/2013 | Babcock | ................ B65D 5/443 |
| | | | | 229/199 |
| 9,949,579 | B1 * | 4/2018 | Frost | ....................... A47F 5/116 |

FOREIGN PATENT DOCUMENTS

| | | | | | |
|---|---|---|---|---|---|
| FR | | 1525689 | A | * | 5/1968 |
| FR | | 1525689 | A | | 5/1968 |
| FR | | 2877551 | A1 | * | 5/2006 ............ A47B 31/00 |
| FR | | 2877551 | A1 | | 5/2006 |
| JP | | S5659580 | U | | 5/1981 |
| WO | | 0234632 | A1 | | 5/2002 |
| WO | WO-0234632 | A1 | * | 5/2002 ............... B62B 3/16 |
| WO | WO-2006048586 | A1 | * | 5/2006 ............ A47B 31/00 |
| WO | | 2010149971 | A1 | | 12/2010 |
| WO | WO-2010149971 | A1 | * | 12/2010 ............ B60B 35/00 |
| WO | | 2018052302 | A1 | | 3/2018 |

* cited by examiner

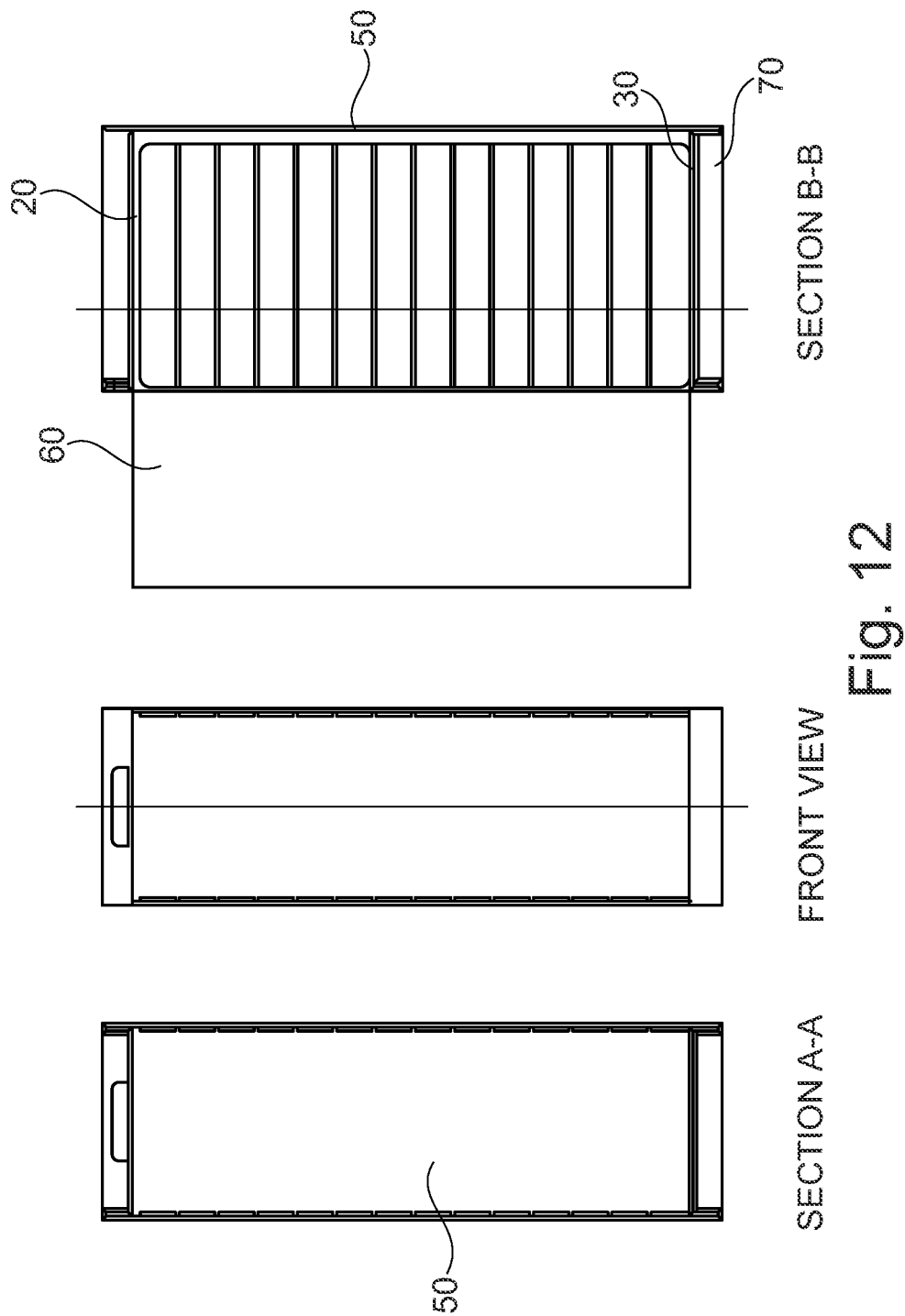

CABINET

FIELD OF THE INVENTION

The present invention relates to the field of cabinet trolleys, in particular intended for the transport and distribution of meal trays. More precisely, the present invention relates to a cabinet or rolling container, the use of a cardboard sheet to form a cabinet and a method of manufacturing a cabinet.

STATE OF THE ART

Commercial aviation has a major technical problem in that it spends a lot of resources to contain and transport passenger food in hygienic conditions. There is a problem of energy consumption in the manufacture of the cabinets and then in their transport, as the containers are made of metal and are heavy, in addition to the need for hygiene; moreover, the whole process is dependent on a specific circuit from one airport to another, including the management of returns. The metal cupboards or cabinets, in particular rolling containers, must in fact be re-routed, washed and stored, which raises numerous technical problems that are also energy-consuming and involve poorly controlled health risks, since it is practically impossible to clean these trolleys in the narrow spaces available in the aircraft, and they are often stored in unsanitary hangars.

There are trolleys that have attempted to solve some of the above problems. Patent FR 2 877 551, discloses a trolley, composed of two elements, namely a "base" and a "cabinet", characterized by the fact that these two elements can be "removably attached together" and that the cabinet can be made of a non-metallic material, in particular cardboard, the base of which may or may not also be made of a non-metallic material, in particular cardboard. Nevertheless, this invention still has many practical disadvantages, in particular the use of metal elements for its base/rolling system, as well as the use of a cabinet, in a traditional form, that is bulky and heavy and difficult to store.

From patent application WO2018/052302 is known a foldable trolley, so that it can be stored or stowed easily. However, this trolley is made of robust, metal-like materials and is still heavy.

An objective of the present invention is to solve one or more problems: (i) the excessive weight of metal trolleys/trolleys currently in use (ii) the high cost of manufacturing such trolleys (iii) the problems associated with the whole circuit of their handling, related management and storage.

SUMMARY OF THE INVENTION

The present invention provides a cabinet provided for transporting and distributing meal trays, characterized in that it is made of a reusable or non-reusable, water repellent, fireproof and smokeproof alveolate cardboard material.

In a preferred embodiment, the side of the cardboard, once folded, can be covered inside the panels with a thin isothermal film, which thus makes it possible to keep the meal trays warm or cold.

In one embodiment, the cabinet comprises a door, which when open allows access to a tiered or staged set of pairs of rails also made of cardboard on its two opposite face walls allowing the multi-storied/staged horizontal holding of the meal trays.

In one embodiment, the staged set of pairs of rails also made of cardboard on two face walls is obtained by precutting/folding.

Pairs of grooves may be provided on the two opposing face walls, which allows the horizontally staggered holding of the meal trays.

In one embodiment the top face comprises an opening system, while the front face forming a door is reclosable, in particular to transform the cabinet into a waste bin.

In one embodiment, the cabinet comprises rolling means, preferably made of recyclable material(s), which are fixed to the lower face by forced fitting or by means of clips.

The present invention also relates to the use of a flat sheet of recyclable cardboard with a thickness of 6 mm to 10 mm, pre-cut in a structured manner, to form a cabinet.

The invention also provides a method of manufacturing a cabinet comprising providing a flat sheet of recyclable cardboard of thickness 6 mm to 10 mm, pre-cut in a structured manner and with fold lines, folding the sheet of cardboard along the cut and fold lines, to form a cabinet.

The method may include attaching a rolling system to the lower face or base face by press-fitting or clipping.

Advantageously, by using a lightweight material for single use, without maintenance and without reuse of the food-containing part, hygiene regulations can be met, since the food-containing part should not be recycled but incinerated to avoid the multiplication of germs.

Advantageously, the reprocessing, storage and transport circuit is drastically reduced. In addition, the cabinet preserves a bacteriologically clean circuit.

DESCRIPTION OF THE FIGURES

Further features and advantages of the present invention will be apparent from the description given below with reference to the attached drawings which illustrate a non-limiting example of its implementation, of which:

FIG. 12 represents a view of a cardboard sheet in an assembly step of a manufacturing process according to an embodiment of the invention.

DETAILED DESCRIPTION

Figure 1:
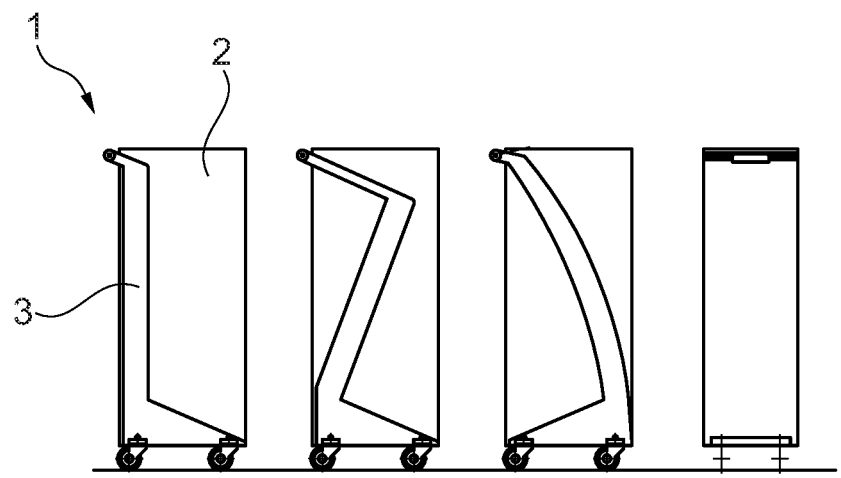
FIG. 1 is a cross-sectional view of a trolley with a cabinet according to one embodiment of the invention.

In the drawings, identical or similar elements are indicated with identical or similar reference numbers.

In FIG. 1 is illustrated a trolley 1 according to an embodiment of the present invention.

The trolley 1 comprises a cupboard or cabinet 2, mounted with a reinforcing frame 3, the presence of a reinforcing frame is given as a non-limiting example.

The reinforcing frame 3 may be made of aluminium.

Figure 2:
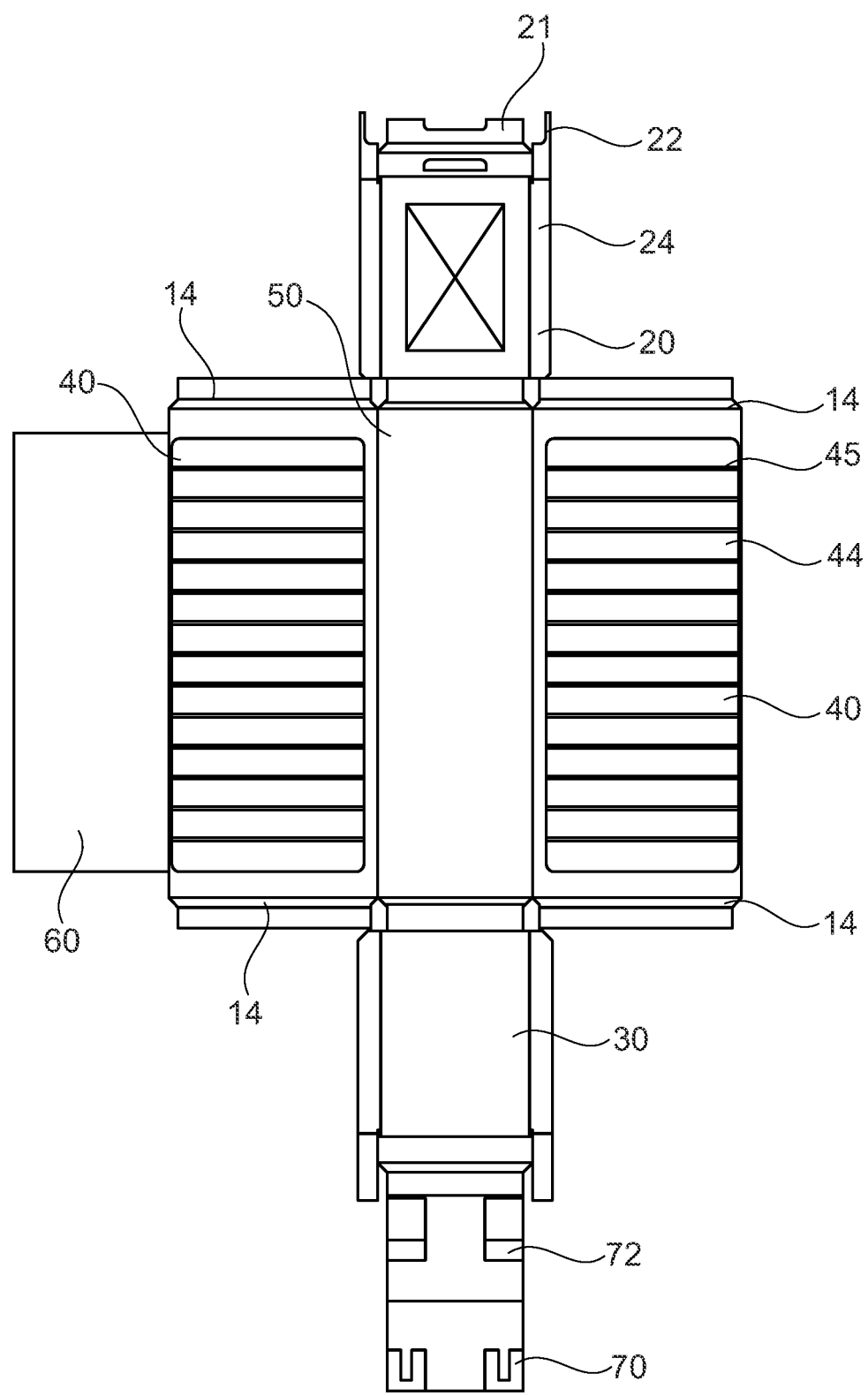
FIG. 2 is a view of a cardboard usable according to an embodiment of the invention.
Figure 3:
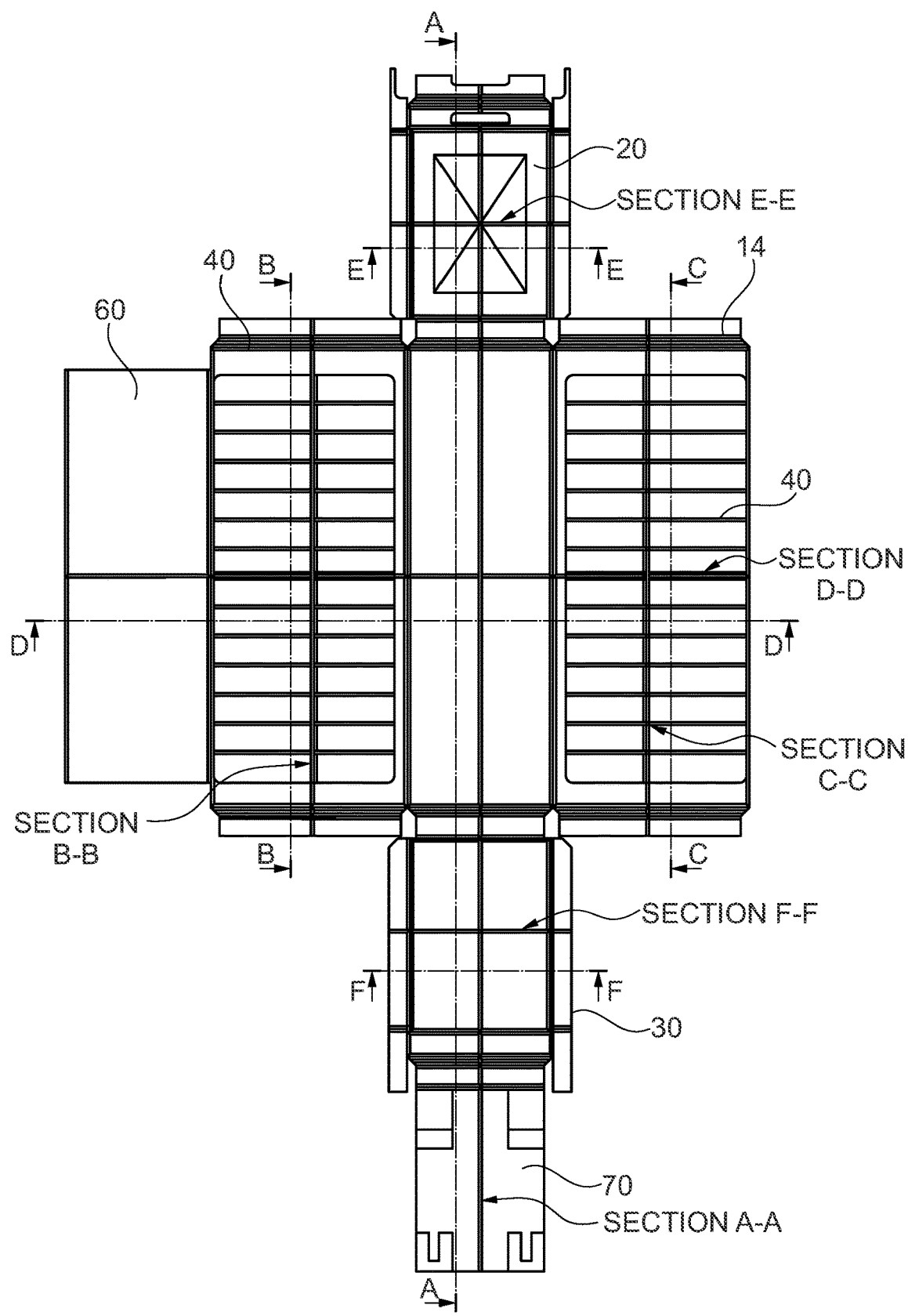
FIG. 3 is a view of a cardboard sheet usable according to an embodiment of the invention.
Figure 3:
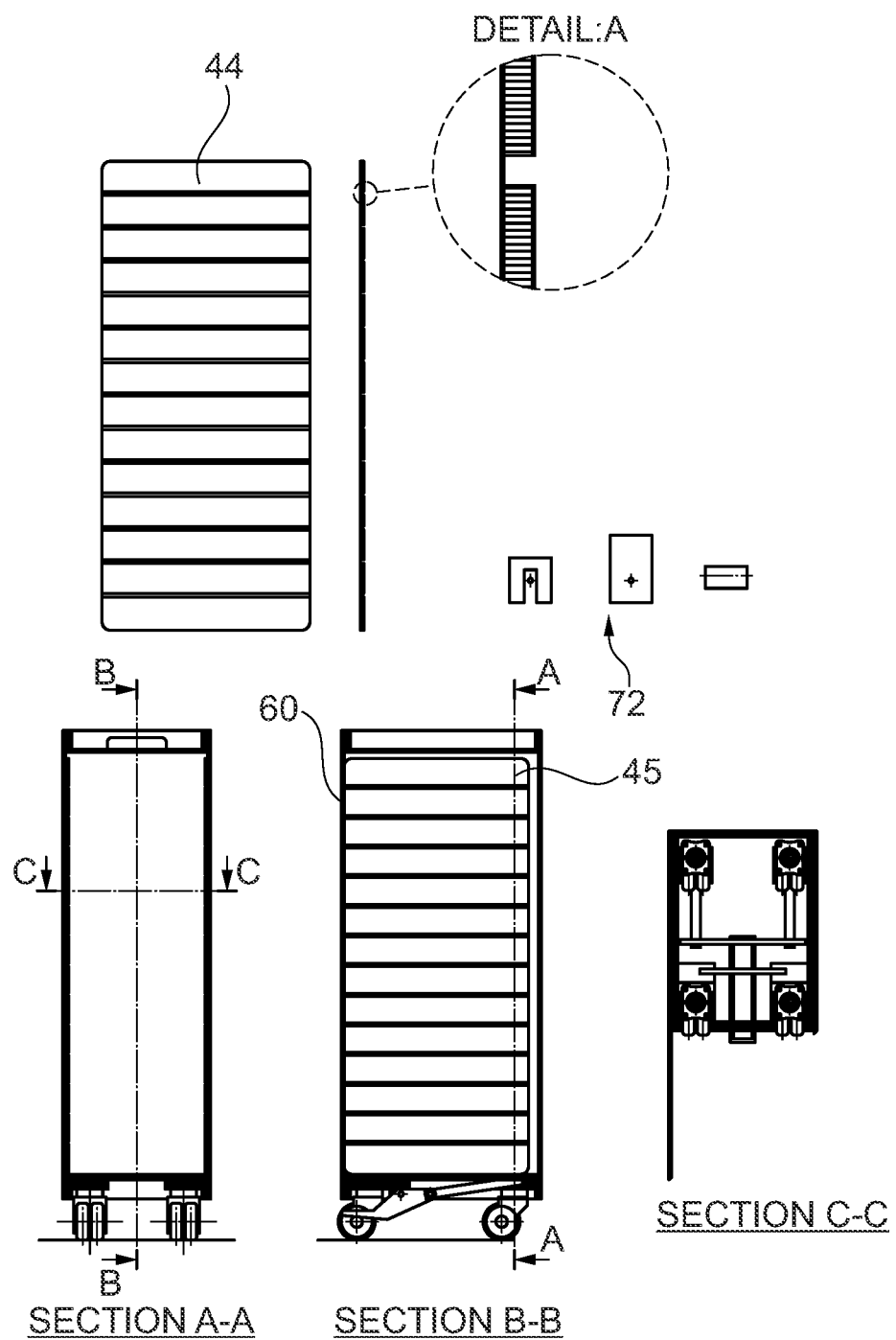

The cabinet 2 is made of cardboard. The cabinet 2 is formed by folding and assembling a piece of cardboard 10 as seen in FIG. 2 or FIG. 3.

The piece of cardboard 10 is a flat sheet or plate, which comprises cut-outs with grooves and fold lines 14 in order to form a container, preferably parallelepipedal in shape, in one piece once folded and assembled.

The cut-outs 20, 30, 40, 50, 60, 70 are provided so that, once folded and assembled, the cardboard sheet 10 forms a cabinet delimiting an interior space with an upper face 20, a lower face 30, side panels 40, a rear face 50 and a front face 60.

The top face 20 is pre-cut to allow it to be opened and to provide access to the interior of the container.

As seen in FIG. 3, the top face 20 includes a front flap 21 at the front, into which a handle is cut and which forms the top front face when folded through 180°. The front flap may be formed by two flaps to be doubled.

A reinforcing half face flap 22 can also be provided on each side, with a pre-cut handle, between the two front flaps at the front, a front flap 23 at the rear which doubles the rear face, and two face flaps 24 between the upper flaps of the side panels and the face panels. Thus, when assembled, the cardboard comprises a top face 20, which is horizontal and flat in the operational position, providing a top flange of several centimeters around its entire perimeter.

In addition, the top face 20 comprises an opening system, such as a pre-cut in the thickness of the cardboard. Thus, the top face can be opened while the door is closed, in particular to transform the cabinet into a waste bin. Thus, at the end of the service, the top wall of the cabinet can be opened, so as to be transformed into a waste bin in which the staff can throw empty meal trays, cups and other waste after use.

The two side panels 40 and the rear face 50 also have lower face flaps to mount the inner face as a mirror image of the upper face.

The lower face 30 is preferably doubled with the flap of an additional thickness of cardboard, i.e., with a base face 70, to which alveolate or corrugated cardboard reinforcements of the rolling system are attached.

The front face 60 is intended to form a door, which is pre-cut in the extension of the left face panel and along its fold lines closes the container completely.

The cabinet obtained once the cardboard is folded and assembled has a door, to preserve and protect the integrity of its contents and prevent the meal trays from sliding.

The base 70 includes supports 72 to receive and secure a rolling system. Thus, once the cabinet is assembled, rolling means can be attached to it. The cardboard, once assembled and fitted with the rolling system, has the general shape of a trolley cabinet type container.

In one embodiment, the rolling system is force-fitted or snap-fitted to cardboard reinforcements positioned on the lower face of the trolley. In another embodiment, the cabinet is placed on and fitted to a rolling system from which it can then be removed. In a preferred embodiment, this rolling system can be folded.

The rolling system is also made of a recyclable material.

The side panels 40 are provided with grooves 45 or a support system, pre-cut in a second thickness of cardboard 44, mirror laminated, which when deployed is positioned horizontally and perpendicular to the side panels. This groove or support system allows the staged holding of meal trays substantially horizontally, as illustrated in detail in FIG. 3.

Thus, the staged set of rail pairs also made of cardboards on the two side panels is also obtained by precutting/folding.

The staged set of pairs of rails also made of cardboard on the two side panels is obtained by factory counter-gluing of two "Interior Face Panel" faces to the two interior side panels faces of the trolley.

Thus, once assembled, the cabinet comprises a door, which, when opened, allows access to a stepped/multi-storied/staged set of rail pairs also made of cardboard on its two opposite side panels allowing the horizontal stepped holding of the meal trays, as illustrated in section B-B of FIG. 3.

One or more panels may be covered with a thin insulating film inside the cabinet, to keep the meal trays warm or cold. The film can be added after the cardboard is folded or on the flat cardboard sheet before folding.

The dimensions of the container (height, width, depth) are designed to match one of the standards used by airlines. For example, the standards used today are ATLAS, KSSU, ACE, but these standards may evolve and the present invention is not limited to these standards.

The flat sheet used to manufacture the cabinet is made of a recyclable, water repellent or waterproof, fireproof and smokeproof cardboard material, so as to comply with the standards applicable in the aeronautical field.

Preferably, the flat cardboard sheet is made of cardboard with a thickness of 6 mm to 10 mm, pre-cut in a structured manner.

Figure 4:
FIG. 4 illustrates a detail of a cardboard sheet according to an embodiment of the invention.

A honeycomb structure or alveolate structure is also stronger, as illustrated for example in FIG. 4, showing a 6 mm thick cardboard in the non-limiting example. The honeycomb structure may be contained between an outer and an inner wall.

The person skilled in the art understands that the so-called outer wall should not be cut when preparing the fold lines.

The cutting angle is approximately 45° to the vertical in FIG. 4, i.e., an angle of 90° for the V-cut.

Thus, catering departments receive batches of pre-cut flat cardboard sheets, which facilitates the handling of the cabinets with a significant gain in storage space, keeping in mind that a half-cart/trolley cabinet following ATLAS standard allows for the storage of an average of 14 meal trays and that a medium-haul aircraft can accommodate up to 189 passengers, so 14 half-cart/trolley cabinets are needed to store the meals. Once the cabinet is assembled, it occupies the same volume as a traditional trolley. However, storing empty (unassembled) trolleys takes up to five times less space.

Even with its rolling system, the weight of a half-cart/trolley cabinet made according to the invention does not exceed 5 kgs, compared with approximately 16 kgs for a metal model of the ATLAS standard type.

In addition, once the aircraft has arrived at its parking area, a recycling company can recover the used trolleys and a catering company loads the aircraft with new trolleys ready for use. In addition to saving time, the problems of hygiene and cleaning of trolleys and the management of leftovers from meal trays are eliminated.

This means that the reprocessing, storage and transport cycle is drastically reduced or eliminated.

And the cabinet preserves a bacteriologically clean circuit.

Similarly, the manufacturing cost of a cabinet according to the invention does not exceed about twenty euros compared to six to eight hundred euros for a metal cabinet. With a much lower energy consumption, from the manufacturing to the destruction, and taking into account the air phase.

In addition, the face of the cardboard that, once folded, corresponds to the outface of the cabinet can be printed with various advertisements, in particular with offers relating to products sold on the plane. It can also include an RFID-type chip for instant identification of the contents and food traceability.

A method of assembling a cabinet according to an embodiment of the invention is explained in FIGS. 5 to 12, which illustrate various manufacturing steps, with reference to the sheet of FIGS. 2 and 3.

The assembly process starts with the pre-cut sheet lying flat, with the observer positioned to the right of it in the description of the example shown.

Figure 5:
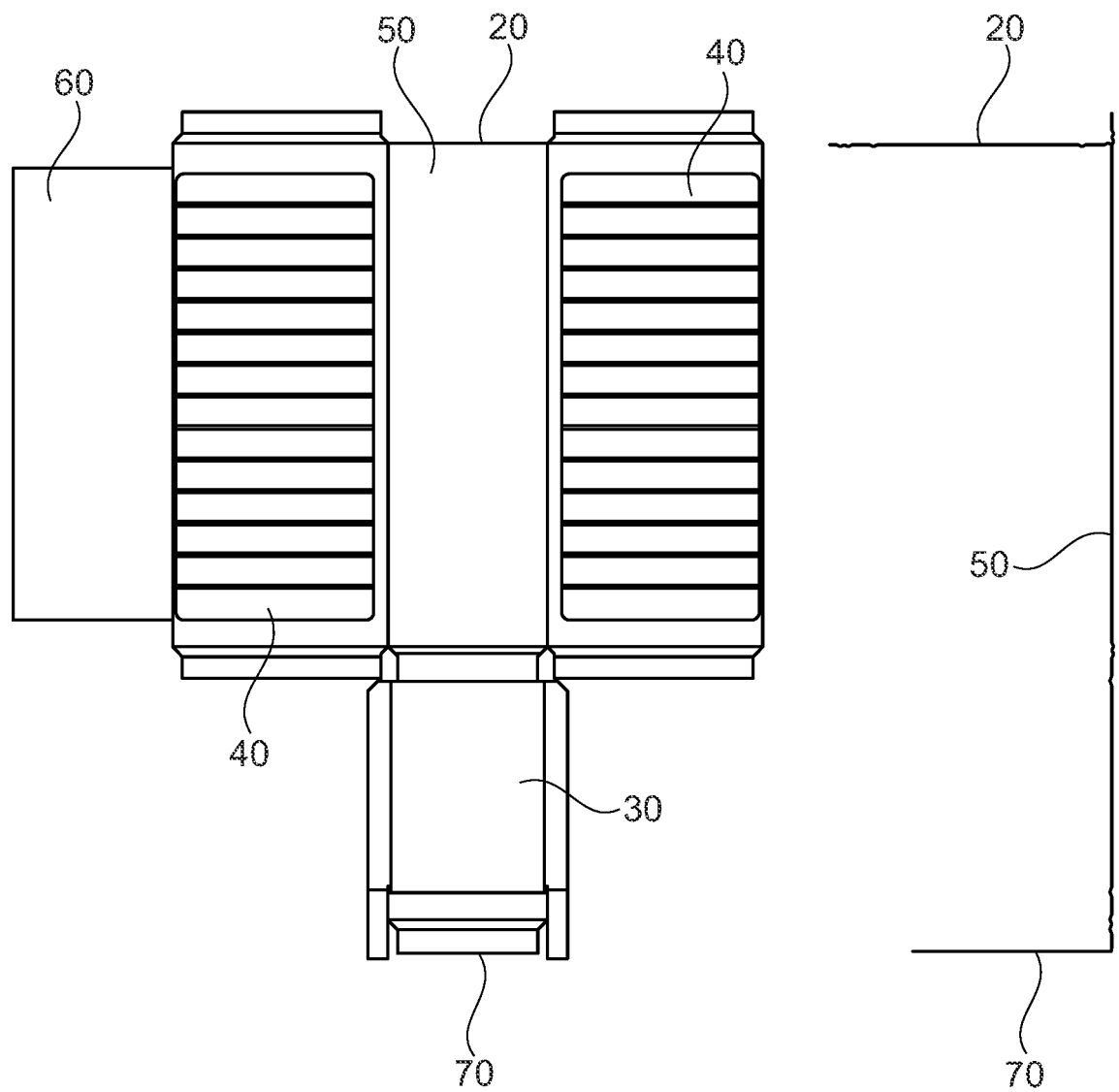
FIG. 5 represents a view of a cardboard sheet in an assembly step of a manufacturing process according to an embodiment of the invention.
Figure 6:
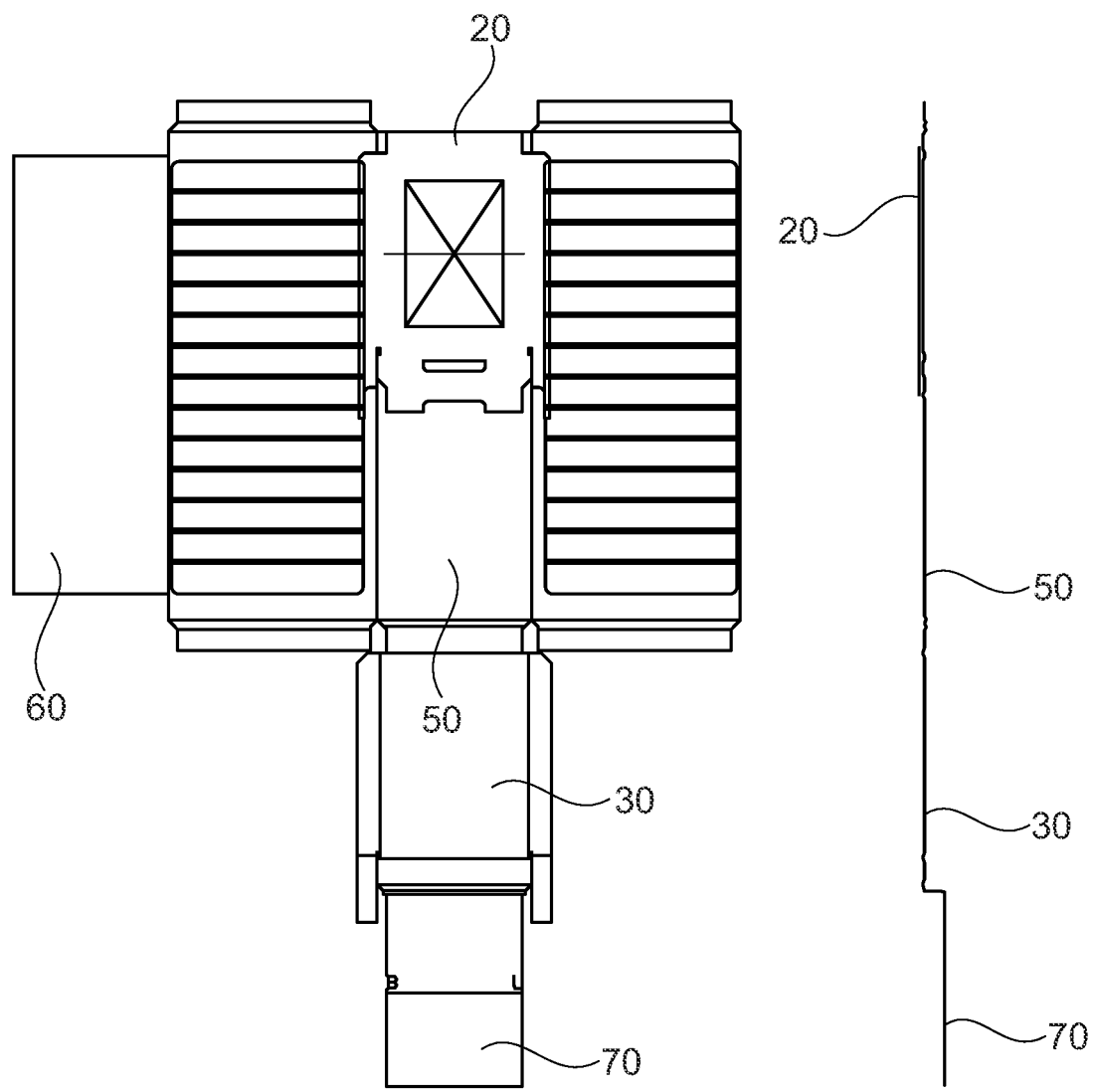
FIG. 6 represents a view of a cardboard sheet in an assembly step of a manufacturing process according to an embodiment of the invention.
Figure 7:
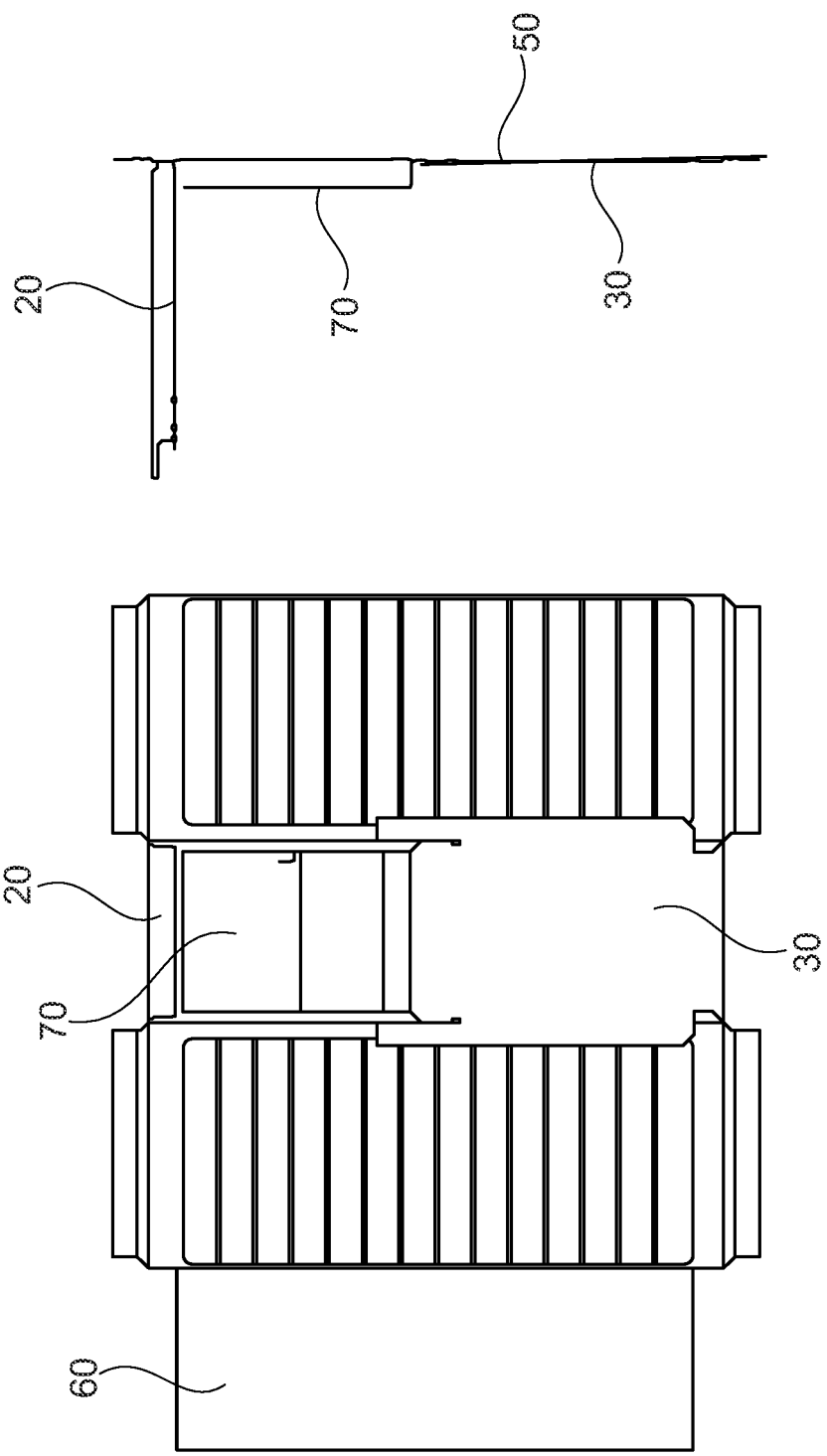
FIG. 7 represents a view of a cardboard sheet in an assembly step of a manufacturing process according to an embodiment of the invention.
Figure 8:
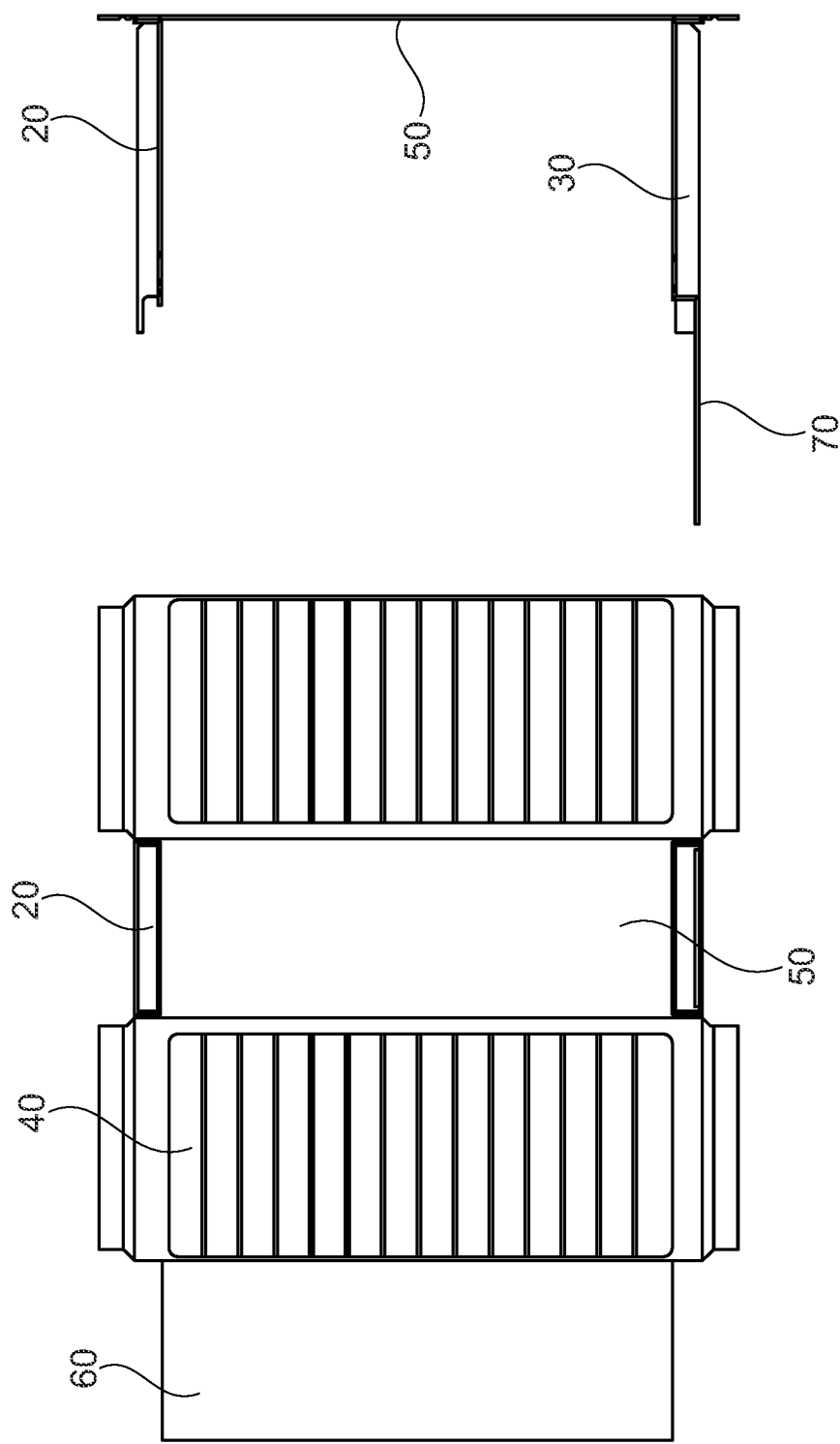
FIG. 8 represents a view of a cardboard sheet in an assembly step of a manufacturing process according to an embodiment of the invention.
Figure 9:
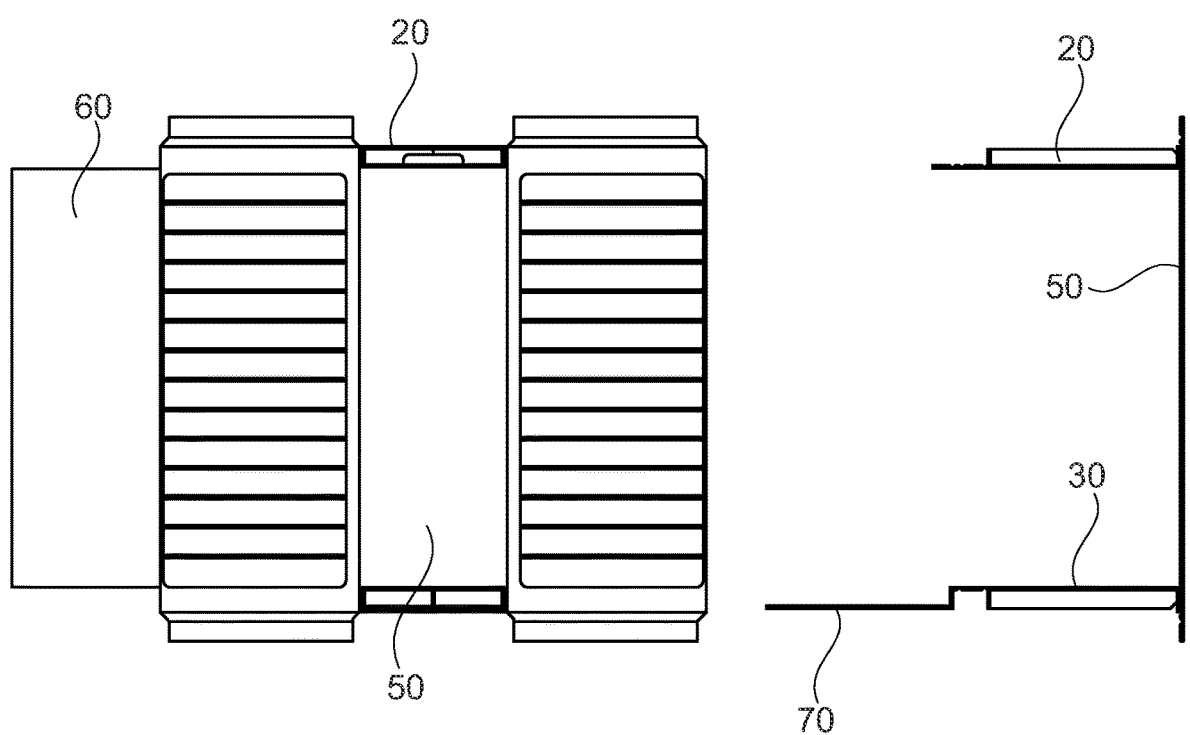
FIG. 9 represents a view of a cardboard sheet in an assembly step of a manufacturing process according to an embodiment of the invention.
Figure 10:
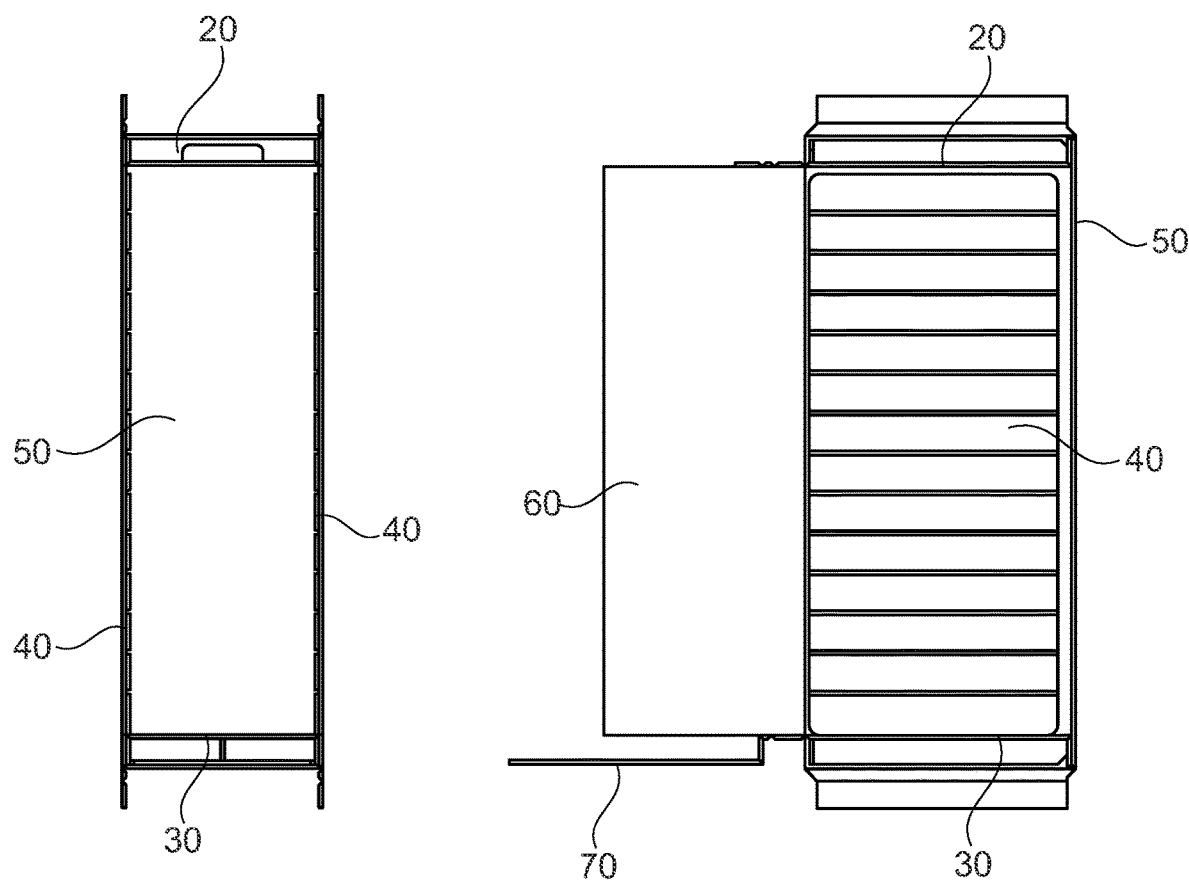
FIG. 10 represents a view of a cardboard sheet in an assembly step of a manufacturing process according to an embodiment of the invention.
Figure 11:
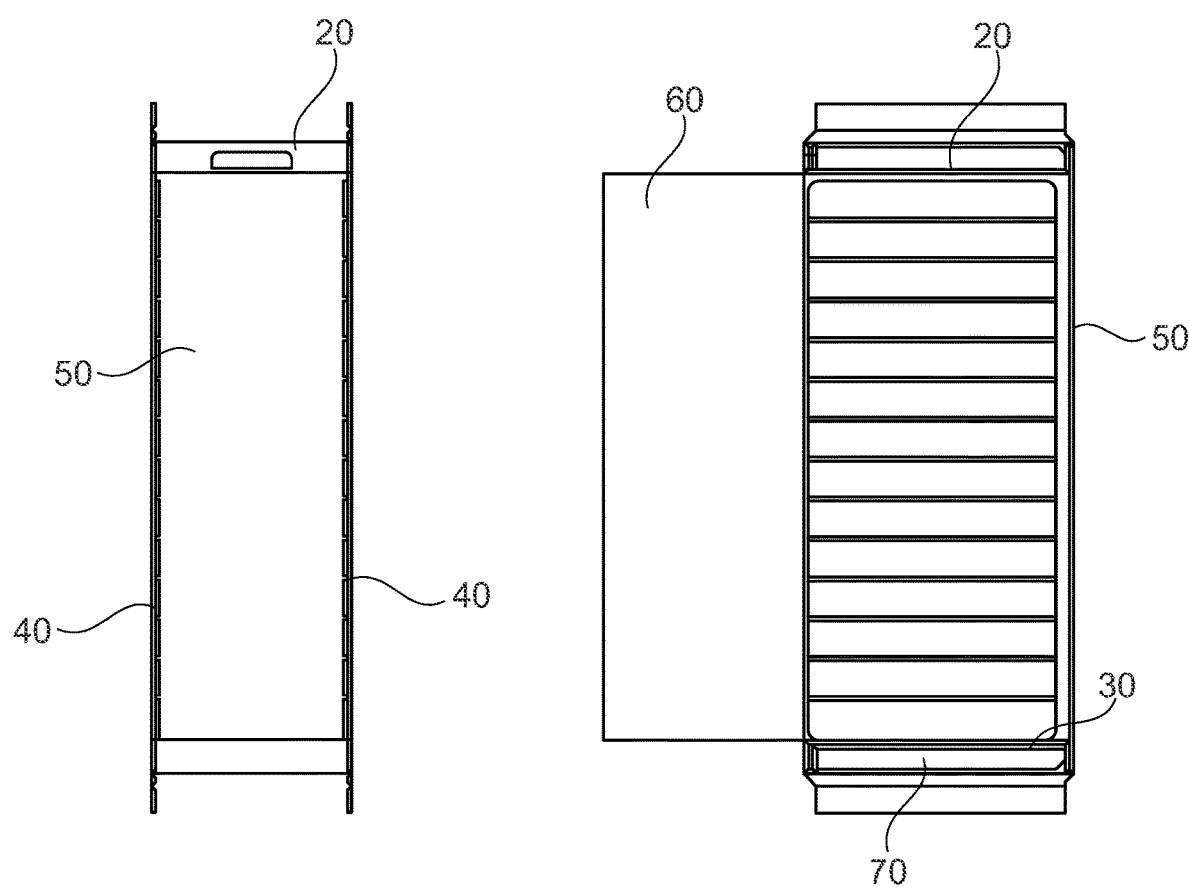
FIG. 11 represents a view of a cardboard sheet in an assembly step of a manufacturing process according to an embodiment of the invention.

1) a) Fold the top panel and its extension 90° counter-clockwise relative to the back panel, b) Fold the base panel 90° clockwise relative to the back panel, as shown in FIG. 5.
2) a) Fold the top panel and its extension flat against the back panel, b) Fold the base panel extension 90° counterclockwise relative to the back panel, as shown in FIG. 6.
3) a) Fold the top panel without the extension 90° clockwise relative to the back panel, b) Fold both faces of the top panel 90° upwards, c) Fold the lower panel and its extension 180° clockwise flat against the back panel as shown in FIG. 7.
4) a) Fold the lower panel without its extension 90° counterclockwise relative to the back panel, b) Fold both faces of the lower panel 90° downwards as shown in FIG. 8.
5) a) Bend the two tabs on the sides of the top panel 90° so that they are parallel to the back panel, b) Bend the two tabs on the sides of the lower panel 90° so that they are parallel to the back panel as shown in FIG. 9.
6) Fold both side panels at 90° relative to the back panel as shown in FIG. 10.)
7) a) Fold the front extension of the top panel 180° clockwise, b) Fold the rear extension of the lower panel 180° counterclockwise, as shown in FIG. 11.
8) a) Fold the top extensions of the side panels 180° towards the top panel. b) Fold the bottom extensions of the side panels 180° towards the base panel, as shown in FIG. 12.

Thus, the object of the present invention is a cabinet with a non-reused container and thus ending the reuse circuit, intended for the transport and distribution of meal trays in aircraft and for the ecological recuperation of waste for eco-energetic reprocessing (e.g. compost), with a low manufacturing cost, since it is made from a single piece of honeycomb or alveolate cardboard, pre-cut in a structured manner so that it can be assembled by simple manual or automated folding operations.

This invention is not limited to the example embodiment described above but embraces all variants thereof. In particular, a feature illustrated and/or described in combination with other features may be provided independently or in combination with other features illustrated independently or in combination with other features and this respectively independently or in arbitrary combination

The invention claimed is:

1. A cabinet trolley for transporting and distributing meal trays and waste recuperation in aircraft, the cabinet trolley comprising an upper face, a lower face, two side faces, a rear face, and a front face forming a door, which are made of a single piece of cardboard; wherein said cardboard comprises a fireproof, water-repellent, alveolate cardboard material,
   the front face being hinged to form the door and provide access to an interior space bounded by the upper face, lower face, side faces and front face, wherein
   a staged set of rail pairs is provided on the two opposite side faces, in the interior space,
   the staged set of rail pairs is made of cardboard and is obtained by counter-gluing to the two opposite side faces in the interior space of the cabinet trolley,
   wherein the upper face comprises an opening system, while the front face forming the door is closed to transform the cabinet trolley into a waste bin,
   wherein the cabinet trolley is a disposable single use trolley that can be used to store the meal trays, to have the meal trays served, to accommodate the meal trays after the meal distribution in aircraft and to be disposed in its entirety comprising the meal trays and eventual food waste in the waste bin.

2. The cabinet trolley according to claim 1, the staged set of rail pairs is obtained by precutting/folding.

3. The cabinet trolley according to claim 1, further comprising pairs of grooves on the two opposite side faces.

4. The cabinet trolley according to claim 1, wherein an isothermal film is provided in the interior space.

5. The cabinet trolley according to claim 1, comprising a rolling system, which are fixed to the lower face by forced fitting or by means of clips, in particular fixed to a base face connected to the lower face, the base face being formed in said piece of cardboard.

6. The cabinet trolley according to claim 1, comprising a rolling system secured by clipping or snapping into a base of the cabinet.

7. The cabinet trolley according to claim 5, wherein the rolling system is made of a recyclable material.

\* \* \* \* \*